United States Patent [19]
Erikson et al.

[11] Patent Number: 6,099,166
[45] Date of Patent: Aug. 8, 2000

[54] LONGITUDINAL STABILIZER FOR VIBRATION REDUCING BUSHING

[75] Inventors: Keith W. Erikson, Hollis; Kenneth W. Erikson, Amherst, both of N.H.

[73] Assignee: Kerk Motion Products, Inc., Hollis, N.H.

[21] Appl. No.: 09/277,009

[22] Filed: Mar. 26, 1999

[51] Int. Cl.⁷ ................................................. F16C 33/02
[52] U.S. Cl. ..................... 384/278; 384/296; 384/299
[58] Field of Search ........................... 384/42, 276, 296, 384/299; 74/89.15

[56] References Cited

U.S. PATENT DOCUMENTS

| | | | |
|---|---|---|---|
| 2,675,283 | 4/1954 | Thompson | 384/299 |
| 3,318,642 | 5/1967 | Peterson | 384/215 |
| 4,106,359 | 8/1978 | Wolfe et al. | 74/89.15 X |
| 4,131,031 | 12/1978 | Erikson et al. | 74/441 |
| 4,353,264 | 10/1982 | Erikson et al. | 74/441 |
| 4,566,345 | 1/1986 | Erikson et al. | 74/89.15 |
| 4,974,464 | 12/1990 | Erikson et al. | 74/89.15 |
| 5,079,963 | 1/1992 | Yamamoto et al. | 74/89.15 |
| 5,219,232 | 6/1993 | Adams et al. | 384/901 X |
| 5,249,869 | 10/1993 | Mabe | 384/278 |
| 5,286,014 | 2/1994 | Chakko | 384/397 X |
| 5,601,372 | 2/1997 | Erikson et al. | 384/278 |
| 5,732,596 | 3/1998 | Erikson et al. | 74/441 |

*Primary Examiner*—Khoi Q. Ta
*Attorney, Agent, or Firm*—Hamilton, Brook, Smith & Reynolds, P.C.

[57] ABSTRACT

A rider having a centralizing or radially stabilizing bushing that reduces vibration and a longitudinal stabilizer element or lip to prevent longitudinal translation of the stabilizing bushing. The centralizing bushing maintains contact, alignment, and general stability between the bushing and the shaft and reduces noise and fluctuations between the bushing and the shaft when they are moving relative to each other. The bushing is mounted in the rider and includes a bearing engagable with the shaft and a cap engagable with the longitudinal stabilizing unit. There are high friction, elastomeric means engagable with the bearing for limiting movement of the bearing away from the shaft and the rider is under unbalanced radial load conditions. The coefficient of thermal expansion of the bearing is essentially the same as the coefficient of thermal expansion of the shaft. The bearing is made of a thermoplastic resin mixed with carbon fiber and having a coefficient of thermal expansion which is essentially the same as that of the shaft such that the shaft and bearing will expand and contract essentially at the same rate in response to the temperature changes.

15 Claims, 5 Drawing Sheets

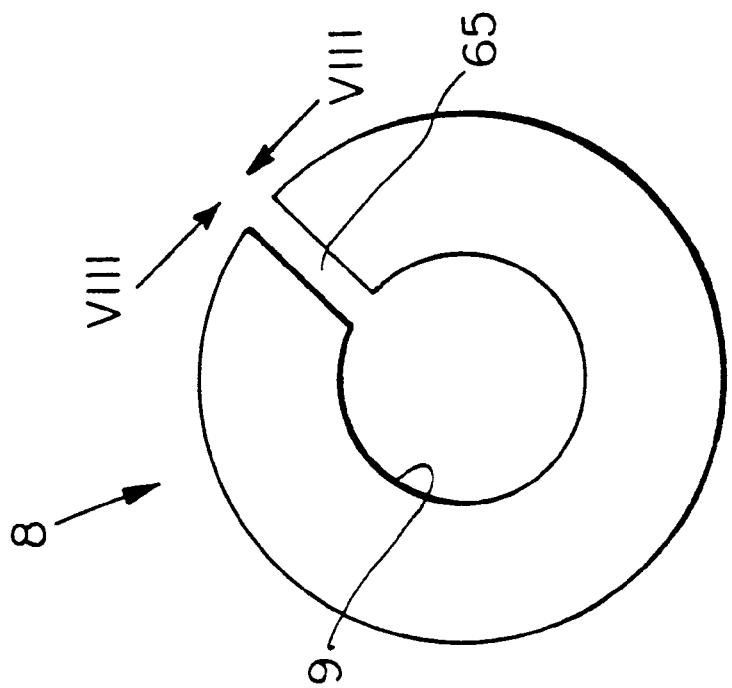
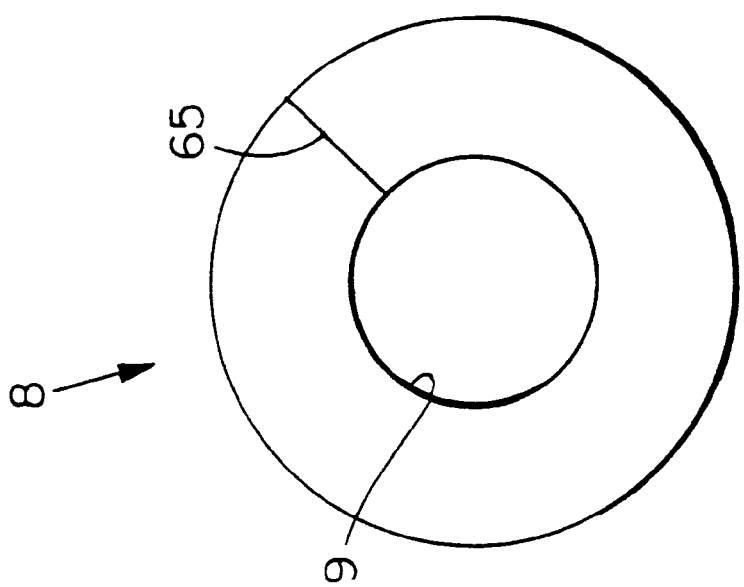

LONGITUDINAL STABILIZER FOR VIBRATION REDUCING BUSHING

BACKGROUND OF THE INVENTION

The invention resides in a rider of the type witch translates in bilateral directions along a rotating screw to move a load which is attached to it. The rider has a centralizing or radially stabilizing bushing that reduces vibration. The centralizing bushing maintains contact, alignment, and general stability between the bushing and a shaft and reduces noise and fluctuations between the bushing and the shaft when moving relative to each other. The bushing is constructed so as to maintain the relationship between the rider and shaft while ignoring temperature changes.

It is important that a rider, such as a nut or hub, which mounts a load, particularly one which is cantilevered, and which translate along a shaft or a rotating screw be free from radial play or transverse motion of the shaft axis. A typical mechanism is shown in our U.S. Pat. Nos. 4,566,345 and 5,601,372.

If, for example, the load were a laser device which aims at a target at a substantial distance from the laser, looseness of the mounting nut relative to the screw, of even a few ten-thousands of an inch, can result in the laser beam missing a target by feet, even though the angle of error is very small.

Conventionally, such nuts and screws have both been made of steel or other like metals. There are a number of disadvantages of running steel-on-steel. Periodic or continuous lubrication is required, otherwise the metal will be subject to spalling, seizing, or galling. However, in many instances, lubrication must be limited, if not completely prohibited, due to the environment in which the mechanism is being operated. The lubrication between a nut and a screw could inadvertently become transferred to items manufactured in a manufacturing process, soiling the products and making them potentially unsaleable.

Another problem is noise. Often, metal running on metal is noisy when there is a degree of looseness, regardless of lubrication, because of harmonic and other vibrations induced in the metal.

Attempts have been made to overcome the lubrication and noise problems by constructing the bearing of one metal and the shaft of another, the bearing usually being made of a softer metal than the shaft. This solution itself creates problems due to galvanic action and from temperature changes inducing inconsistent thermal expansion or contraction.

A circular bearing grows radially with heat, with both its inside and outside diameters expanding. Conversely, cold tends to reduce both the internal and external diameters. Similarly, the bearing and screw will expand axially when exposed to an increase in temperature and contract axially when exposed to a decrease in temperature. Consequently, a shaft or screw of one metal or a threaded rod rotating hi a circular bearing or threaded nut of another metal may either bind or become loose, in both the axial and radial directions, with temperature changes.

The amount of expansion or contraction of a metal due to heat or cold is a function of its coefficient of thermal expansion expressed in inches, per inch, per degree Fahrenheit (in/in/° F.). If the bearing or nut has a higher coefficient of expansion than the shaft or screw, upon being subjected to heat, looseness resulting in play will be created between the screw and the nut resulting in noise and inaccurate operation. Conversely, if the nut and the screw or the bearing and shaft become colder during operation, as for example from an operation moving from indoors to outdoors, and if the coefficient of expansion of the nut is greater than the screw, the internal diameter can decrease and the parts could seize.

Other problems also exist in maintaining a bushing within a rider once inserted. As the rider translates along the shaft or rotating screw, the rotation of the shaft coupled with the longitudinal motion of the rider can cause the bushing to loosen within the rider and subsequently move along the axis of the shaft separately from the rider. Also, when exposed to changes in temperature, the bushing can expand axially and radially. While the radial expansion of the bushing would be fully constrained by the rider, the axial expansion would be constrained by the rider only along one bushing surface. Thus, the bushing would be free to expand outwardly of the rider. In either situation, once the bushing moves partially out of the rider, it becomes ineffective in removing vibrations between the rider and the shaft. Similarly, once the bushing has migrated from the rider, it can no longer maintain shaft stability and proper shaft alignment.

SUMMARY OF THE INVENTION

The invention is embodied in a rider having a centralizing bushing and a longitudinal stabilizing element of the type described in our U.S. Pat. No. 5,601,372. A bushing is mounted within the rider and cooperates with a shaft or screw for reducing noise and fluctuations between the bushing and the shaft when they are moving relative to each other. The bushing contains a bearing which is comprised of an elastomeric material. The bushing is mounted in contact with the longitudinal stabilizing element and within a rider which may be a hub or other device for mounting a load. The shaft may be a threaded lead screw, in which case, the rider would be internally threaded to translate back and forth along the screw as the shaft is rotated.

The bearing in the bushing is directly engagable with the shaft. It has at least one face which extends radially of the shaft. High friction, elastomeric means are engagable with the face for limiting movement of the bearing away from the shaft when the rider is under an unbalanced radial load condition. A cap secures the bearing within the rider or hub. The high friction, elastomeric means may be at least one elastomeric washer or could include two washers, one on each side of the bearing. In like manner, high friction, elastomeric means may be spray coated onto a surface of the bearing or a surface in the rider which may be engaged directly by the bearing.

The bearing is made of a thermoplastic resin mixed with carbon fiber and has a coefficient of thermal expansion essentially the same as that of the shaft such that the shaft or bearing will expand and contract essentially at the same rate in response to temperature changes.

The rider contains a bore for receiving the bushing, the inner end of which abuts the bearing and prevents axial movement only in one axial direction. The open end of the rider comprises a longitudinal stabilizer element in the form of a lip along the outer edge of the bore. The lip prevents longitudinal translation of the bushing caused by rotation of the shaft or by expansion due to temperature change. The lip engages the cap to secure the bearing with the bore. The lip call be formed as a continuous member. In an alternate embodiment, the lip is non-continuous, having a series of finger protrusions which radiate from the edge of the bore inwardly toward the shaft. In either embodiment, the lip can be formed integrally with the rider. Alternately, in either embodiment, the lip can be a separate element attached to the rider.

The above and other features of the invention including various and novel details of construction and combination of parts will now be more particularly described with reference to the accompanying drawings and pointed out in the claims. It will be understood that the particular rider embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIGS. 7 and 8 are the schematic renditions of a cylindrical bearing employed in the centralizing bushing.

DETAILED DESCRIPTION OF THE INVENTION

Figure 1:
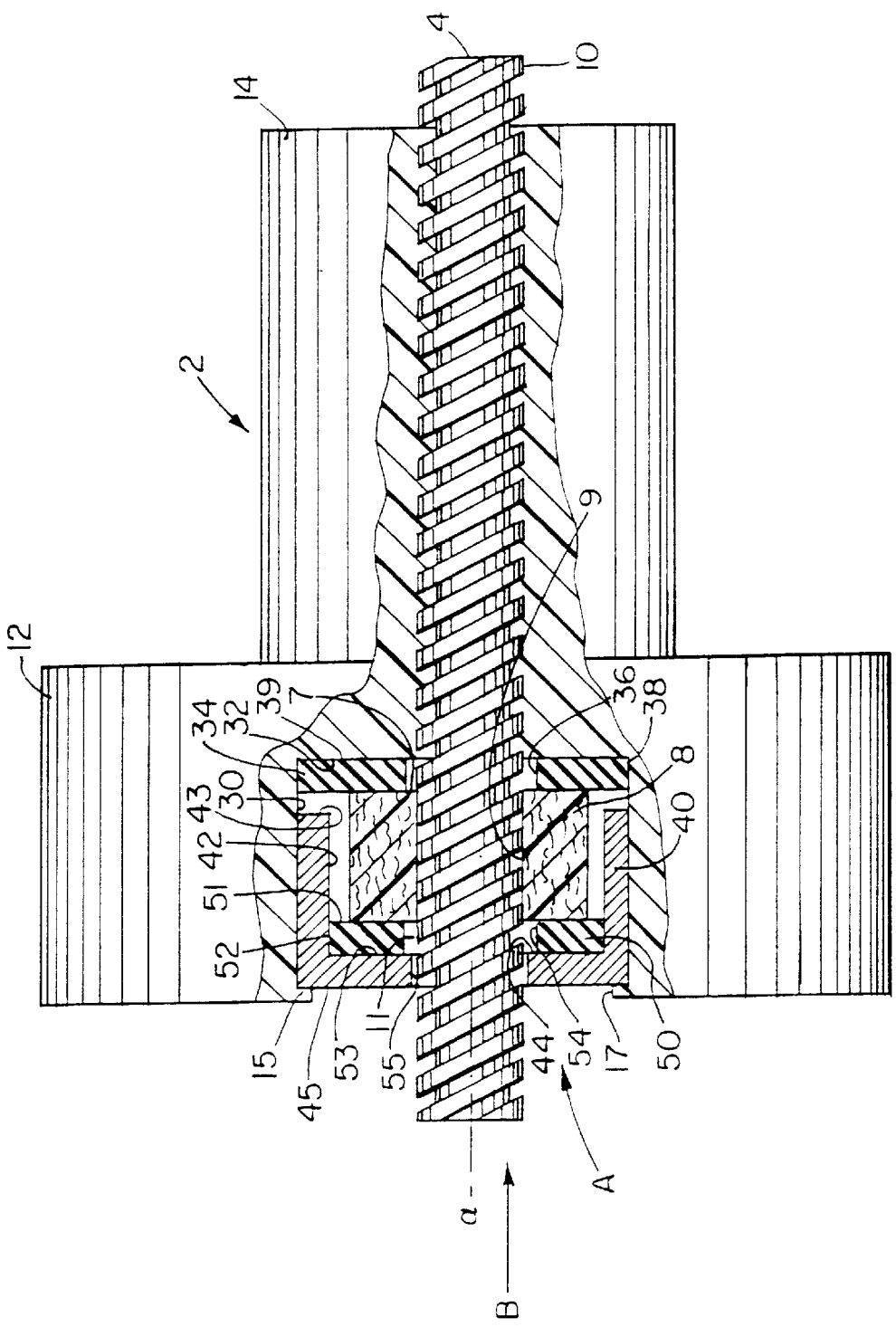
FIG. 1 illustrates a rider, partially in section, mounted for bilateral translation along a rotational lead screw, hi which the invention is embodied.

Referring to FIG. 1, the invention is embodied in a composite rider, generally indicated 2. A centralizing bushing, generally indicated A, is mounted within the rider 2. The rider 2 is internally threaded to receive a rotating lead screw 4 of the same hand and pitch. The lead screw 4 has a central axis α. The rider translates back and forth along the screw 4 lengthwise of the axis α depending upon the direction of rotation of the screw. The rider is adapted to mount a load (not shown) for reciprocation in a direction parallel to the axis α of the screw.

The bushing A includes a cylindrical bearing 8 which directly engages the outer diameter 10 of the threads of the screw 4 or it engages the outer diameter of a non-threaded rod (not shown), in which case, the rider 2 is not threaded. The bearing 8 (i.e. the portion of the centralizing bushing A which engages the screw 4) is made of a thermoplastic polycarbon such as a acetyl or nylon containing from about 25% to 35% carbon fibers made of graphite resulting in a coefficient of expansion of $11 \times 10^{-6}$ inches per inch per degree Fahrenheit. The bearing 8 does not require lubrication, may be machined or molded and will expand and contract in contact with the steel lead screw or shaft 4 as temperature fluctuates. The rider 2, may be acetyl or nylon but does not have the carbon fiber additive. The shaft may be made of 303 stainless steel having a coefficient of thermal expansion of approximately $9.6 \times 10^{-6}$ inches per inch, per degree Fahrenheit.

The rider 2, which can be a nut or a hub, has a first cylindrical portion 12 and a smaller, concentric, second cylindrical portion 14. The rider 2 is internally threaded to mate with the threads of the lead screw 4. In the illustrative example, when the lead screw 4 is rotated, the rider 2 will translate relative to the shaft and when the slhaft's rotation is reversed, the rider 2 will reverse direction. A load mounted to the rider 2 can provide a force winch allows the rider 2 to resist the rotational movement of the lead screw 4 and translate along its axis α. It will be understood that if the shaft 4 is a non-threaded metallic rod or shaft, the rider 2 would not translate.

The centralizing bushing A is retained within the rider 2 in a bore 30. The bore is formed in the first cylindrical portion 12 and terminates in a flat circular surface or rear wall 32. A longitudinal stabilizer element or member in the form of an inwardly projecting circular lip 15 is formed at the outer edge of the bore 30. The lip 15 prevents longitudinal translation of the centralized bushing A caused by an axial force created by the rotation of the lead screw 4 against the bearing 8 or by expansion of the bushing due to temperature change. The lip 15 extends radially inwardly toward the central axis α of the bore 30 to allow sufficient contact with the external face 45 of a cap 40 to prevent longitudinal movement of the centralized bushing A.

The rear wall 32 and a washer 34 prevents motion in the opposite direction. The washer 34 is composed of high friction elastomeric material such as neoprene and has a bore 36 which is slightly larger than the outer diameter 10 of the shaft or lead screw 4. The washer 34 fits over the lead screw 4 and accommodates rotation without actually engaging the shaft or screw 4. The outer diameter 38 of the elastomeric washer 34 is constructed to fit into the bore 30 in the cylindrical portion 12 of the rider 2. A flat face 39 of the elastomeric washer 34 is engagable with the circular surface 32 of the bore 30. The outer face of the washer 34 engages a face 7 of the cylindrical bearing 8.

FIG. 1 also shows a similar washer 50 engages the opposite side or face 11 of the bearing 8. The purpose of the elastomeric washers 34 and 50 are to assure that the bearing does not move, shift, rotate or cock under load conditions, particularly when the load is eccentric to the axis α of the shaft. Such loads are column, see our U.S. Pat. No. 4,566, 345. Eccentric loading of the rider 2 has a tendency to cock it and thus squeeze and twist the bearing 8 moving it partially out of engagement with the shaft 4 in a radial direction.

The anti-friction washer 50 is pressed against the face of the bearing 8 by the retaining cap 40. The retaining cap 40 has a bore 42, which terminates in a flat, interior surface 44. The bore 42 receives the anti-friction washer 50, with elastomeric washer 50 engagable with the interior surface 44 of the cap 40. The retaining cap 40 is provided to hold the assemblage together in the bore 30 as illustrated in FIG. 1. The cap 40 has a flat annular face 43 at the open end.

The second high-friction elastomeric washer 50 has flat faces 51 and 53, an outer diameter 52 and an inner bore 54 which is larger than the outer diameter 10 of the lead screw 4. A circular opening 55 is formed at the left-hand face of the cap 40 and is of larger diameter than the outside diameter of the lead screw 4.

The bearing 8 which is pressed by the washer 50, in turn presses against the anti-friction washer 34 and the washer is pressed against the surface 32. The high friction washers 34 and 50 prevent shifting of the carbon filled bearing 8 preventing mechanically induced movement but at the same time permitting thermal expansion or contraction of the bearing 8 uniformly in the radial direction.

Heat is generated at the contacting surface 10 of the lead screw 4 and the inner diameter 9 of the bearing 8. Since their coefficients of expansion are essentially the same, as the lead screw 4 grows radially the inner diameter 9 of the bearing 8 grows an equal amount maintaining the elements in contact at all times thus preventing the rider 2 from wobbling relative to the lead screw 4 as, for example, when wear takes place between the threaded interior of the rider 2 and the threads of the lead screw.

As an alternative use to the high friction elastomeric washers, the faces 7 and 11 of the bearing may be coated with a high friction elastomeric material as, for example, by spraying. The surface 44 of the cap 40 and the surface 32 of the rider 2 may likewise be sprayed.

The radial stabilizing bushing A is assembled in the following manner. The elastomeric washer 34 is placed in the bore 30 in the cylindrical portion 12 of the rider 2 with its face 39 against the surface 32. The bearing 8 is assembled onto the lead screw 4 with its face 7 against the face 35 of the elastomeric washer 34. The flat face 51 of the second elastomeric washer 50 is placed in engagement with the flat face 11 of the bearing 8. The cap 40 is then forced past the inwardly extending lip 15 and pressed into the bore 30 in the rider 2. The lip 15 must have an inner diameter 17 which is smaller than the diameter of the bore 30 in order to prevent the cap 40 from undergoing longitudinal displacement once inside the bore 30. The lip 15 will yield to the force of the cap 40 as it enter-s the bore 30. As the cap 40 passes the lip 15, the lip 15 will return to its original shape, creating a snapping sound. The external face 45 of the cap 40 is held within the bore 30 by the tip 15 located on the outer edge of the bore 30. The outer diameter 41 of the cap and the inner diameter of the bore 30 are dimensioned to form a press fit. The internal face 44 in the cap 40 presses the elastomeric washer 50 against the flat face 11 of the bearing 8. By this construction, the cap 40 squeezes the elastomeric washer 50 against the bearing 8, and the bearing 8 against the elastomeric washer 34, which in turn is urged against the bottom 32 of the bore 30. Because the bore 36 of the washer 34 and the bore 54 in the washer 50 are greater than the diameter 10 of the lead screw 4, only the bearing 8 engages the lead screw. The longitudinal stabilizing element or lip 15 prevents the bearing assembly from coming out of the rider 2.

Figure 2:
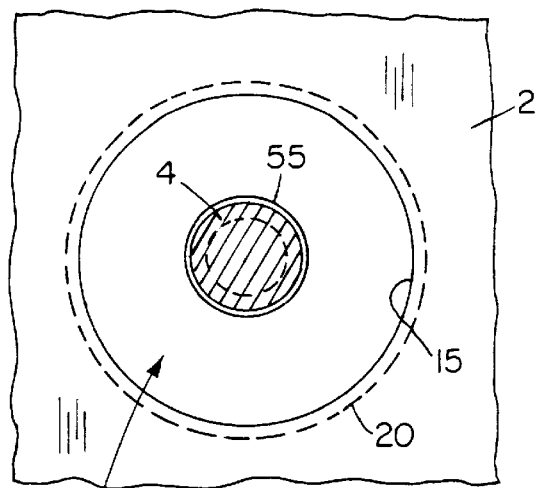
FIG. 2 is an end view of the rider, looking in the direction of the arrow B in FIG. 1, showing one embodiment with the longitudinal stabilizer element.

A view of the invention from the direction of arrow B in FIG. 1, illustrated in FIG. 2, shows the lip 15 located along the edge of the bore 30. In this configuration, the lip 15 is a continuous ring 20 formed integral with the bore 30. The lip 15, in this embodiment, can be either machined or molded as part of the rider 2.

Figure 3:
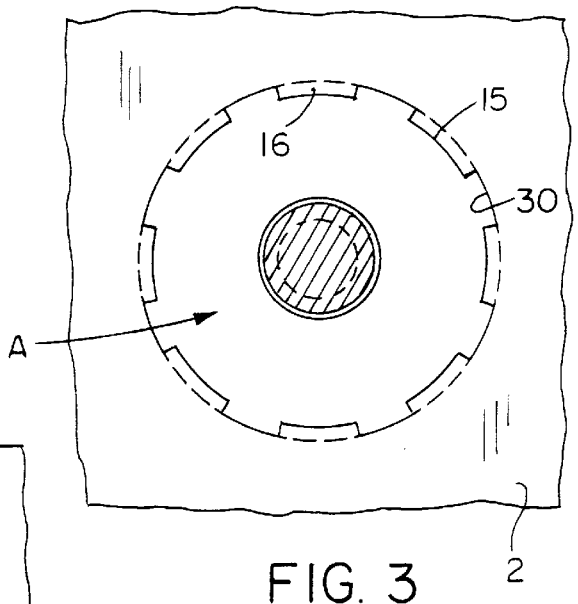
FIG. 3 is an end view of the rider, similar to FIG. 2, where the longitudinal stabilizer element incorporates retaining protrusions extending from the inner rider wall.

In FIG. 3, all alternate embodiment of the invention shows the lip 15 as being non-continuous, having projections 16 formed integral with the bore 30. The non-continuous ring, formed of the projections 16, function similarly as the continuous ring 20. In this alternate embodiment, the non-continuous ring can be machined or molded as part of the rider 2. Either a continuous or a non-continuous ring can retain the centralized bushing A within the bore 30.

Figure 5:
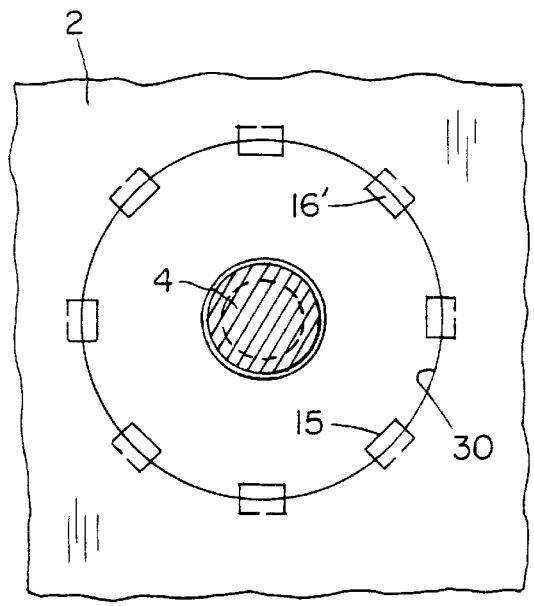
FIG. 5 is all end view of the rider, similar to FIGS. 2 and 3, showing the longitudinal stabilizer member as retaining protrusions inserted into the rider wall.
Figure 4:
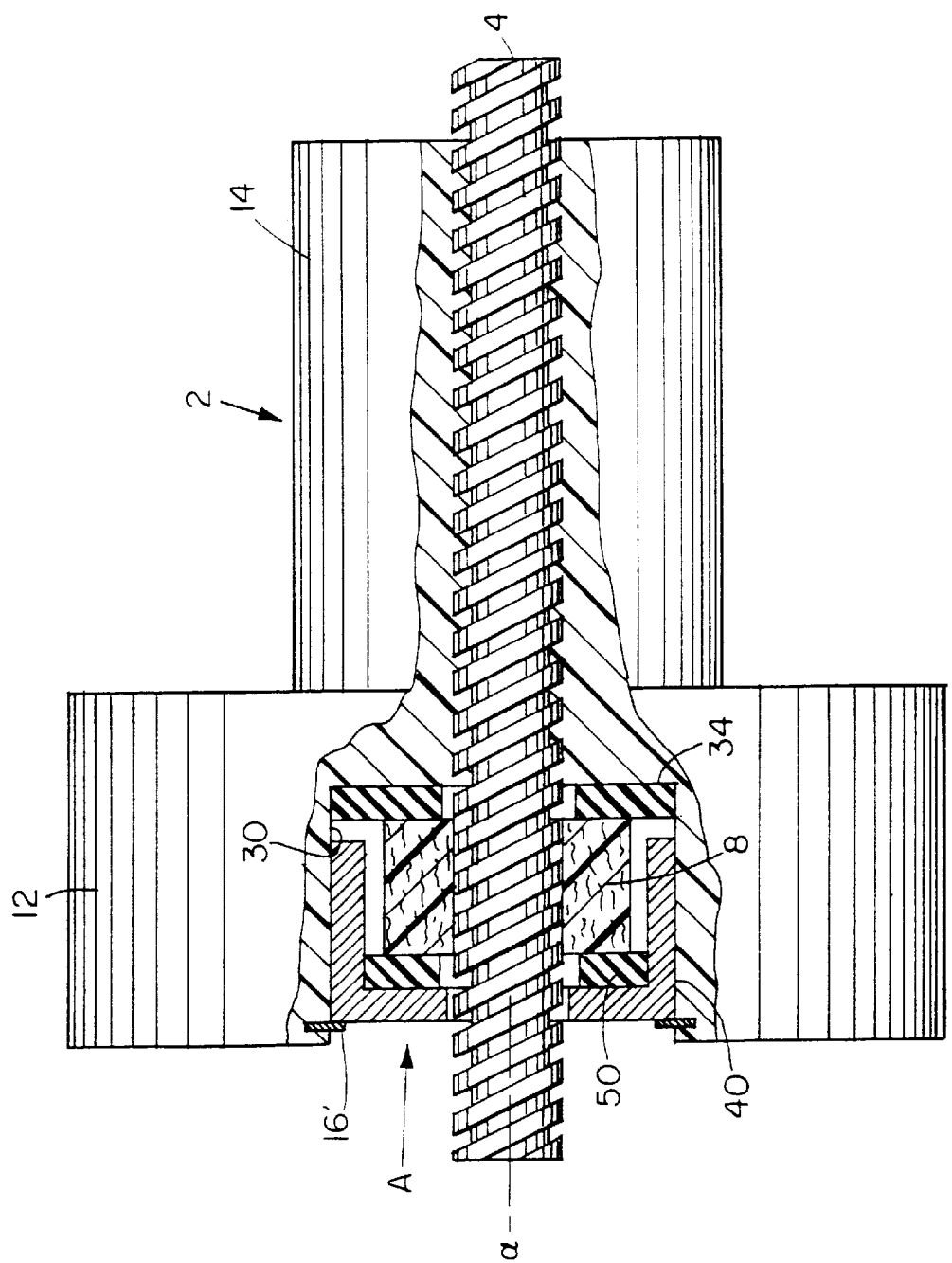
FIG. 4 is a view similar to FIG. 1 whereby the longitudinal stabilizer element is an insert.

The ring, either continuous or non-continuous, can also be non-integral with the bore 30. FIGS. 4 and 5 show a non-continuous ring where the components 16' of the ring are secured in the edge of the bore 30, allowing a variety of materials to be used as the lip 15. The various materials which can comprise the lip 15 can be chosen to have elastic moduli different than that of the bore 30. Thus, the rigidity or flexibility of the lip 15 can be changed by substituting different materials for the lip 15.

Figure 6:
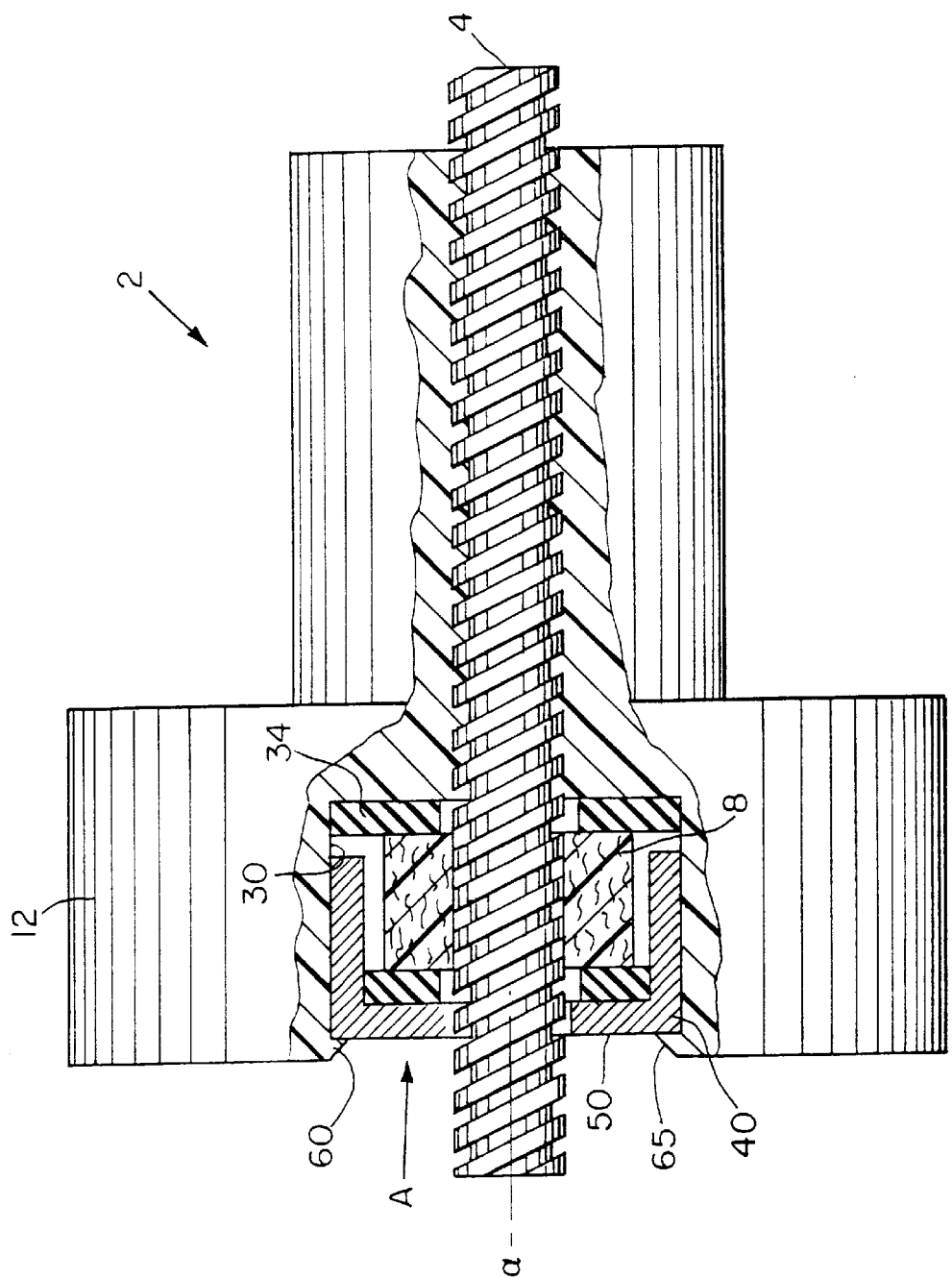
FIG. 6 is a view similar to FIG. 1, showing a rider having an alternate embodiment of the invention.

In another embodiment shown in FIG. 6, the lip 60, whether continuous or non-continuous, can be beveled. FIG. 6 shows a lip or continuous ring 60 having a bevel 65. The bevel 65 is angled to allow a user to easily snap the components of the bushing past the tip 60 into the bore 30 and to prevent the components from longitudinal translation outside the bore 30. When the bushing components are pressed past the ring 60 and into the bore 30, an audible snap can be heated to indicate that the bushing components are securely within the bore 30.

Means are provided to eliminate any tendency for the bearing 8 to cock or twist while it is being positioned in the bore 30. It is possible that, during assembly, the faces 7 and 11 of the bearing 8 will not be maintained parallel to the face 32 in the bore 30 or the face 44 in the cap. The bearing 8 may be provided with a slit at 65 as shown in FIGS. 7 and 8. The normal tendency of the slit is to stay closed. It is shown closed in FIG. 7. When the split version of the bearing 8 is placed into the bore 30, it is first opened as seen in FIG. 8 which facilitates its being assembled with ease between the washers 34 and 50 may be positioned initially on the shaft 4. However, its tendency is to close in the directions of the arrows VIII—VIII in FIG. 8. It is easier to position the split version of the bearing 8 on the screw 4 than one which is not, rendering the likelihood of cocking less likely. Since the tendency of the bearing 8 is to close the slits (to the position before slitting), it will do so until its inner diameter 9 engages the outer diameter 10 of the lead screw 4. The inner diameter 9 of the bearing 8 may be made slightly smaller than the outer diameter 10 of the lead screw or shaft 4 to assure a snug fit.

While this invention has been particularly shown and described with references to preferred embodiments thereof, it will be understood by those skilled in the art that various changes ill form and details may be made therein without departing from the spirit and scope of the invention as defined by the appended claims.

What is claimed is:

1. A rider associated with a shaft, the rider and the shaft having a common central axis for movement along the shaft comprising:

a cylindrical portion having a receiving chamber with an inner perimeter, and an open end:

a lip, having an inner edge, extending radially from the inner perimeter of the open end of the receiving chamber toward the central axis;

a bushing, mounted within the receiving chamber, having an elastomeric bearing and at least one washer; and a cap secured by the lip within the receiving chamber and adjacent to the bushing.

2. The rider of claim 1 wherein the lip is integral with the cylindrical portion.

3. The rider of claim 1 wherein the lip is attached to the cylindrical portion.

4. The rider of claim 1 wherein the lip further comprises a bevel along its inner edge.

5. The rider of claim 1 wherein the lip comprises a plurality of finger protrusions.

6. The rider of claim 1 wherein the lip comprises a flexible material.

7. The rider of claim 1 wherein the lip is annular.

8. A rider associated with a shaft, the rider and the shaft having a common central axis for movement along the shaft, the rider comprising;

a cylindrical portion having a receiving chamber with an inner perimeter, and an open end;

a lip, having an inner edge, extending radially from the inner perimeter of the open end of the receiving chamber toward the central axis;

a bushing mounted within the receiving chamber, the bushing including a bearing member engagable with the shaft and made of a thermoplastic resin mixed with carbon fiber and having a coefficient of thermal expansion of the shaft;

frictional, elastomeric means engagable with the bearing for limiting movement of the bearing away from the shaft when the rider is under unbalanced radial load correction; and a cap secured by the lip within the receiving chamber and adjacent to the bushing.

9. The rider of claim 8 wherein the lip is integral with the cylindrical portion.

10. The rider of claim 8 wherein the lip is attached to the cylindrical portion.

11. The rider of claim 8 wherein the lip further comprises a bevel along its inner edge.

12. The rider of claim 8 wherein the lip comprises a plurality of finger protrusions.

13. The rider of claim 8 wherein the lip comprises a flexible material.

14. The rider of claim 8 wherein the lip is annular.

15. A method for inserting a bushing into a rider having a receiving chamber and a lip comprising:

providing a bushing and a rider having a lip and a receiving chamber;

forcing the bushing past the lip of the rider;

pushing the bushing into the receiving chamber of the rider;

creating a snapping sound as the bushing enters the receiving chamber of the rider.

* * * * *